United States Patent [19]
Frigo

[11] Patent Number: 5,710,648
[45] Date of Patent: Jan. 20, 1998

[54] OPTICAL COMMUNICATION SYSTEM AND REMOTE SENSOR INTERROGATION

[75] Inventor: Nicholas J. Frigo, Atlantic Highlands, N.J.

[73] Assignee: Lucent Technologies Inc., Murray Hill, N.J.

[21] Appl. No.: 579,986

[22] Filed: Dec. 29, 1995

[51] Int. Cl.⁶ .................................................. H04B 10/08
[52] U.S. Cl. ...................... 359/110; 359/125; 359/167; 340/531; 340/310.06; 340/870.28; 379/39
[58] Field of Search .................................... 359/118, 110, 359/125, 127, 144, 152, 157, 164, 167, 173; 340/531, 555, 578, 870.16, 810.17, 870.29, 310.06; 379/389; 385/12

[56] References Cited

U.S. PATENT DOCUMENTS

| | | | |
|---|---|---|---|
| 4,632,551 | 12/1986 | Pavlath | 356/345 |
| 4,939,482 | 7/1990 | Nergaard et al. | 332/183 |
| 5,039,221 | 8/1991 | Layton et al. | 356/345 |
| 5,119,223 | 6/1992 | Panzer et al. | 359/123 |
| 5,140,154 | 8/1992 | Yurek et al. | 250/227.12 |
| 5,150,243 | 9/1992 | Suzuki | 359/110 |
| 5,200,987 | 4/1993 | Gray | 379/40 |
| 5,241,409 | 8/1993 | Hill et al. | 359/128 |
| 5,272,556 | 12/1993 | Faulkner et al. | 359/128 |
| 5,278,888 | 1/1994 | Myllymäki | 379/39 |
| 5,285,305 | 2/1994 | Cohen et al. | 359/110 |
| 5,319,698 | 6/1994 | Glidewell et al. | 379/39 |
| 5,331,990 | 7/1994 | Hall et al. | 135/65 |
| 5,347,601 | 9/1994 | Ade et al. | 385/3 |
| 5,351,325 | 9/1994 | Miller et al. | 385/42 |
| 5,355,208 | 10/1994 | Crawford et al. | 356/35.5 |
| 5,453,866 | 9/1995 | Gross | 359/144 |
| 5,559,624 | 9/1996 | Darcie et al. | 359/125 |

OTHER PUBLICATIONS

Electronic Letters "Use of a Fibre Loop Reflector as Downstream Receiver and Upstream Modulator In Passive Optical Network" vol. 26, No. 6, 1990, pp. 827–828.

Photonics Technology Letters, "Integrated Optics NxN Multiplexer on Silicon", Oct. 1991, vol. 3, No. 10.

Electronic Letters "Experimental Demostration of a Passive Optical Subscriber Loop Architecture" vol. 24, No. 6, 1988, pp. 344–345.

Electronic Letters "Led Spectral Slicing for Single–Mode Local Loop Applications" vol. 24, No. 7, 1988, pp. 389–390.

Electronic Letters "Passive Optical Local Networks for Telephony Applications and Beyond" vol. 23, No. 24, 1987, pp. 1255–1257.

Proc 2 Annu Broadband Expo 14 Fiber Opt Comm Local Area Network Expo Broad Band 90. "Bi–Directional Broadband Local Network Evolution" pp. 314–318.

BT Technical Journal, "Impact of New Optical Technology on Spectrally–Sliced Access and Data Networks", Apr. 1993, vol. 11, No. 2, pp. 46–55.

Primary Examiner—Kinfe-Michael Negash

[57] ABSTRACT

A sensing system including an optical receiver for receiving downstream optical signals and for converting the downstream optical signals to downstream electrical signals. An optical transducer impresses information in an upstream data signal onto upstream optical signals. At least one sensor responsive to an external stimulus provides sensor information signals. A processor receives the downstream electrical signals and establishes communication channels to at least one communication terminal providing communication information signals, and to the at least one sensor. The at least one terminal and the at least one sensor provide the communication and sensor information signals, respectively, to the processor which forwards the information signals to the optical transducer as the upstream data signal.

36 Claims, 8 Drawing Sheets

OPTICAL COMMUNICATION SYSTEM AND REMOTE SENSOR INTERROGATION

BACKGROUND OF THE INVENTION

1. Field of the Invention

The present invention relates to an optical communication system and, more particularly, to an optical communication system having the ability to interrogate remote sensing devices.

2. Description of the Related Art

Fiber optic technology has completely penetrated the long-haul telephony network due to its inherent low loss and high bandwidth. In the area of local loop applications, financially attractive options have developed more slowly. Recently, substantial research effort has been directed towards developing technology to implement fiber optics within local loop applications (e.g., fiber in the local loop). However, cost, capacity, and switching problems still must be overcome.

Recently, technologies have developed in an effort to more cost effectively introduce fiber into the local loop. For example, a passive optical network (PON) is an optical transmission system requiring no active components to direct optical signals between a central office (CO) or host digital terminal, and a network subscriber's terminal equipment. PONs typically embody a first star formed of a plurality of optical fibers which extend from a CO to each of a plurality of remote nodes. Each remote node may be envisioned as central to a second star formed of a second plurality of optical fibers extending from the remote node, each to one of a plurality of optical network units (ONU). Two well known PON architectures considered for deploying optical fibers into the local loop are "Telephone Over Passive Optical Networks" (TPON) and "Passive Photonic Loops" (PPL).

In the TPON architecture, the CO broadcasts a common signal to all end users served by a given node. Information is segregated within the broadcast signal in individual time slots as a time division multiplexed (TDM) signal. A star coupler at the remote node distributes the broadcast signals to the optical network units. Upstream information is transmitted from each ONU within a particular time slot, received at the remote node, optically multiplexed and directed to the CO. Management of collisions in time and a trade off between delivered optical power and the number of end users limits upgradability and deployment of conventional TPON architecture.

The PPL architecture is a wavelength division multiplexed architecture (WDM) in which each ONU is assigned a unique wavelength by the CO and optical information is wavelength segregated within a transmitted signal. Optical information is transmitted from the CO to a plurality of remote nodes. Each remote node optically demultiplexes its received signals by wavelength, and directs the demultiplexed signals to each ONU. For upstream transmission, each ONU includes a separate optical transmitter at a wavelength assigned to the ONU. Each ONU transmits signals to the remote node where the signals are incorporated by optical multiplexing into a composite signal and transferred to the CO. While WDM PONs have excellent power budgets in general, because all the light intended for a subscriber is directed to that subscriber, current implementation of WDM PONs is quite costly.

In an effort to reduce the cost of implementing WDM PONs for fiber in loop applications and ameliorate operations, an Optical Network Based on Remote Interrogation of Terminal Equipment (RITE-Net™) system has been developed and is disclosed in U.S. patent application Ser. No. 08/333,926 filed Nov. 3, 1994 and is incorporated herein by reference. The RITE-Net™ system operates according to wavelength division multiplexing but avoids the need of individual optical sources (i.e., transmitters) at each ONU. The RITE-Net™ system thus lowers the cost for equipment required at each ONU. In addition to the RITE-Net™ system providing high capacity WDM performance potential at reduced cost, the RITE-Net™ system is flexible enough to allow additional revenue to be produced when it is incorporated into the existing system.

The present invention is provided for introducing fiber into the local loop, preferably as a WDM system, such that there is inherent potential within the system for a network owner to recoup some of the initial costs of implementing the system. In other words, to provide a system in which the initial investment costs may be more quickly recovered over time through revenues derived through additional services provided by the network.

One such service that can be provided by the network to recoup some of the initial investment is to provide the system with remote sensor interrogation. Such remote sensor interrogation, for example, can be used to provide services such as monitoring systems (e.g., fire, burglary, etc.).

SUMMARY OF THE INVENTION

According to an embodiment of the present invention, a sensing system includes an optical receiver for receiving downstream optical signals and for converting the downstream optical signals to downstream electrical signals, an optical transducer for impressing information from an upstream data signal onto upstream optical signals, and at least one sensor responsive to an external stimulus for providing sensor information signals. A processor receives the downstream electrical signals and establishes communication channels to at least one communication terminal providing communication information signals and to the at least one sensor. The at least one terminal and the at least one sensor provide the communication and sensor information signals, respectively, to the processor which forwards the signals to the optical transducer as the upstream data signal. The sensor can comprise means for monitoring changes in temperature, humidity, chemical residues, etc., or for sensing an intrusion in a monitored area.

BRIEF DESCRIPTION OF THE DRAWINGS

So that one skilled in the art to which the subject invention appertains will better understand how to practice the present invention, preferred embodiments of the invention will be described in detail below with reference to the accompanying drawings, in which.

DETAILED DESCRIPTION OF THE PREFERRED EMBODIMENTS

Figure 1:
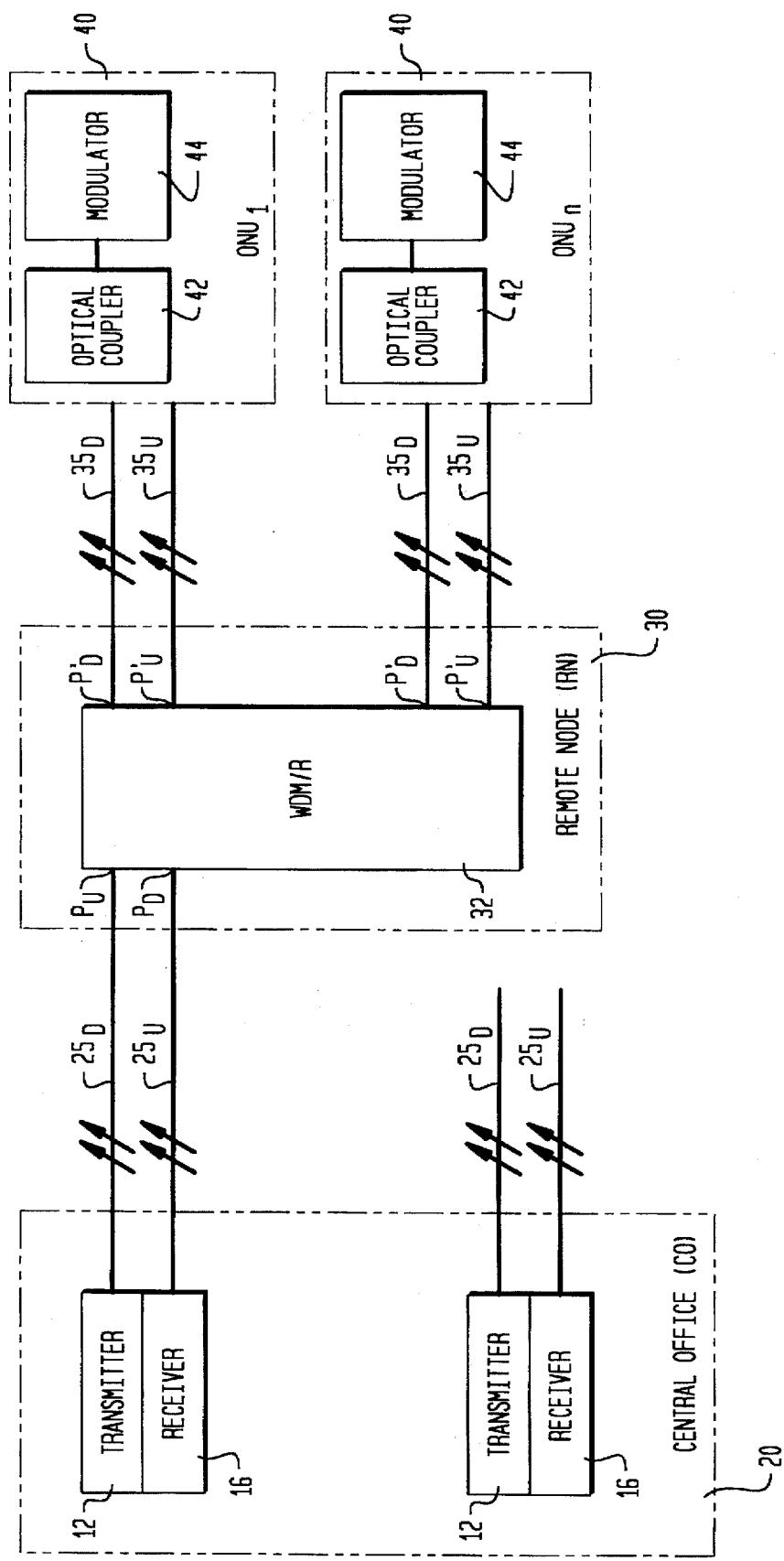
FIG. 1 illustrates a block diagram of a RITE-Net™ passive optical network.

A RITE-Net™ passive optical network is shown in FIG. 1. The network includes one or more frequency tunable or multi-wavelength[1] transmitters 12 (e.g., a laser) and one or more receivers 16 provided at a CO 20. Transmitters 12 encode optical information into a wavelength division multiplexed signal and transmit the signals downstream upon fibers $25_D$ forming a primary star. Each downstream fiber $25_D$ links CO 20 to a remote node 30. A wavelength division multiplexer, preferably a wavelength division multiplexer/router (WDM/R) coupler[2] 32, hereinafter referred to as a "Dragone router", is located at each remote node. WDM/R 32 demultiplexes and directs downstream light received at each remote node 30 to each of a plurality of ONUs 40 via downstream fibers $35_D$ as a function of wavelength. RN 30 is the center of a secondary star comprised of a plurality of ONUs 40.

[1] Zirngibl et al., "A 12-Frequency WDM Laser Based On a Transmissive Waveguide Grading Router, Electronics Letters, Vol. 30, pages 701–702 (1994).
[2] Dragone et al., "Integrated Optics N×N Multiplexer On Silicon", IEEE Phot. Technol. Lett., Vol. 3, pages 896–899 (1991). C. Dragone, "An N×N Optical Multiplexer Using a Planar Arrangement of Two Star Couplers", IEEE Phot. Technol. Lett., Vol. 3, pages 812–815 (1991).

At each ONU 40, optical coupler 42 splits the downstream signal portions arriving at ONU 40 into two or more signal portions. A portion of the split light is overmodulated with subscriber data within modulator 44, and looped back through remote node 30 via upstream fibers $35_u$ and to CO 20 via upstream fibers $25_u$. That is, modulator 44 imprints information on a portion of the split light, which is then directed upstream via fibers $35_u$ and $25_u$ to CO 20. While each of the ONUs can be considered to be the final optical destination, it is possible that one ONU can serve more than one living unit (i.e., more than one end subscriber). It will be appreciated to a person of ordinary skill in the art that variations of the network shown in FIG. 1 are possible. For example, although depicted in the present application as individual fibers, fibers $35_U$ and $35_D$ could be a single fiber and fibers $25_U$ and $25_D$ could be a single fiber. In addition, it should be clear that modulator 44 can provide gain, phase modulation, etc. as desired. Of course, coupler 42 and modulator 44 can also be integrated into a single device as desired.

As discussed above, one of the main impediments to the introduction of fiber optic communications to local subscribers within the telephone network is its initial cost. In an effort to maximize return on initial system cost, the present invention implements a communication system within which an optical network or termination unit is utilized to provide services in addition to conventional communication services.

The present invention defines an optical communication system in which a first ONU forms an optical communication link to/from a CO. The optical communication link may be utilized to link the first ONU to a terminal device. The optical communication link may also link the first ONU to a sensor or an array of sensors. Preferably, the first ONU is a telecommunication subscriber, and the sensor or array of sensors are sensitive to changes within the local environment in the home or business, (e.g., are capable of some type of process for generating a sensor signal for communication to the CO). Sensors can be provided to monitor changes in temperature, sound, pressure, chemical residues, smoke or other environmental changes, for example. In addition, different types of security sensors can be provided to monitor for an intrusion into a household or business, for example.

Figure 2:
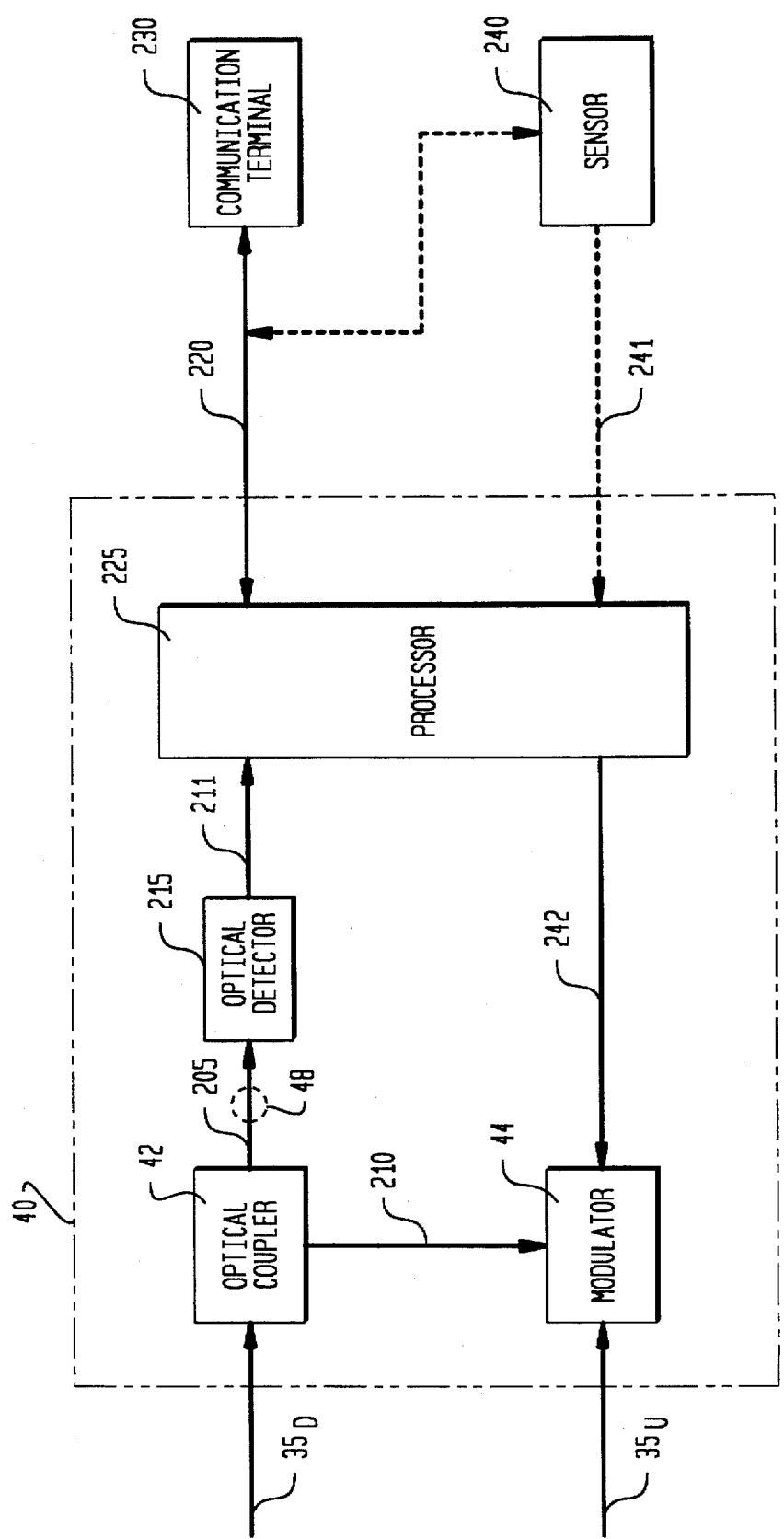
FIG. 2 illustrates a block diagram of an optical network unit and a remote sensor according to an embodiment of the present invention.

An embodiment of the present invention, as illustrated in FIG. 2, is referred to as an "electrical signal reporting" type of system. That is, in this embodiment of the present invention, a sensor reports to an electronic device with information. The electronic device then reports to the central office. In ONU 40, tap coupler 42 splits downstream optical signal portions arriving at ONU 40 via downstream fiber $35_D$ into two or more signal portions 205 and 210. Portion 205 of the received downstream light signal is applied to optical detector 215 where the signal is detected and converted to an electrical signal on path 211. The signal on path 211 is provided to processor 225 which conditions and processes the signal to provide a subscriber "data out" signal representative of the respective downstream information, via path 220. The information on path 220 can represent information that is to be received by communication terminal 230, for example. Upstream information from terminal 230 is transmitted across path 220 to processor 225. In addition, a sensor or sensor array 240 can be provided for transmitting information along path 220 or along a separate path 241 provided for the sensor information. The information transmitted along path 220 and/or path 241 is processed by processor 225, which outputs encoded data on path 242. The encoded data on path 242 is used by modulator 44 to overmodulate (imprint) data onto the light signal on path 210 which is then looped back to remote node 30 via upstream fiber $35_u$. Sensor 240 can comprise any type of well known sensor or sensor array circuitry. For example, an intrusion alarm sensor can be provided that monitors electrical continuity of a circuit. When continuity is broken (e.g., by a wired window or door being opened) such a sensor can automatically dial a security station, for example, and issue a warning that an intrusion has occurred. In the alternative, sensor 240 can issue an emergency alert signal that can be interpreted by the ONU and/or central office as indicating that an intrusion is occurring. Such sensors can also include devices for monitoring changes in temperature, humidity, chemical residues, motion, etc. Sensor or sensor array 240 can be polled by processor 225 to provide sensor information signals in response to a downstream optical signal or the sensor can interrupt processor 225 in response to an external stimulus. Processor 225 can then provide upstream data signals that correspond to a predetermined number or the processor can provide an emergency alert signal in response to the predetermined set of sensor information signals.

It will be clear to a person of ordinary skill in the art that coupler 42 can be a four port device, for example, and modulator 44 can be a reflective modulator. In this case, fiber $35_U$ can be coupled to coupler 42 instead of modulator 44. As described previously, fibers $35_D$ and $35_U$ could be a single fiber, modulator 44 can provide gain, modulate phase, etc. and coupler 42 and modulator 44 can be integrated into a single device, as desired.

Figure 3A:
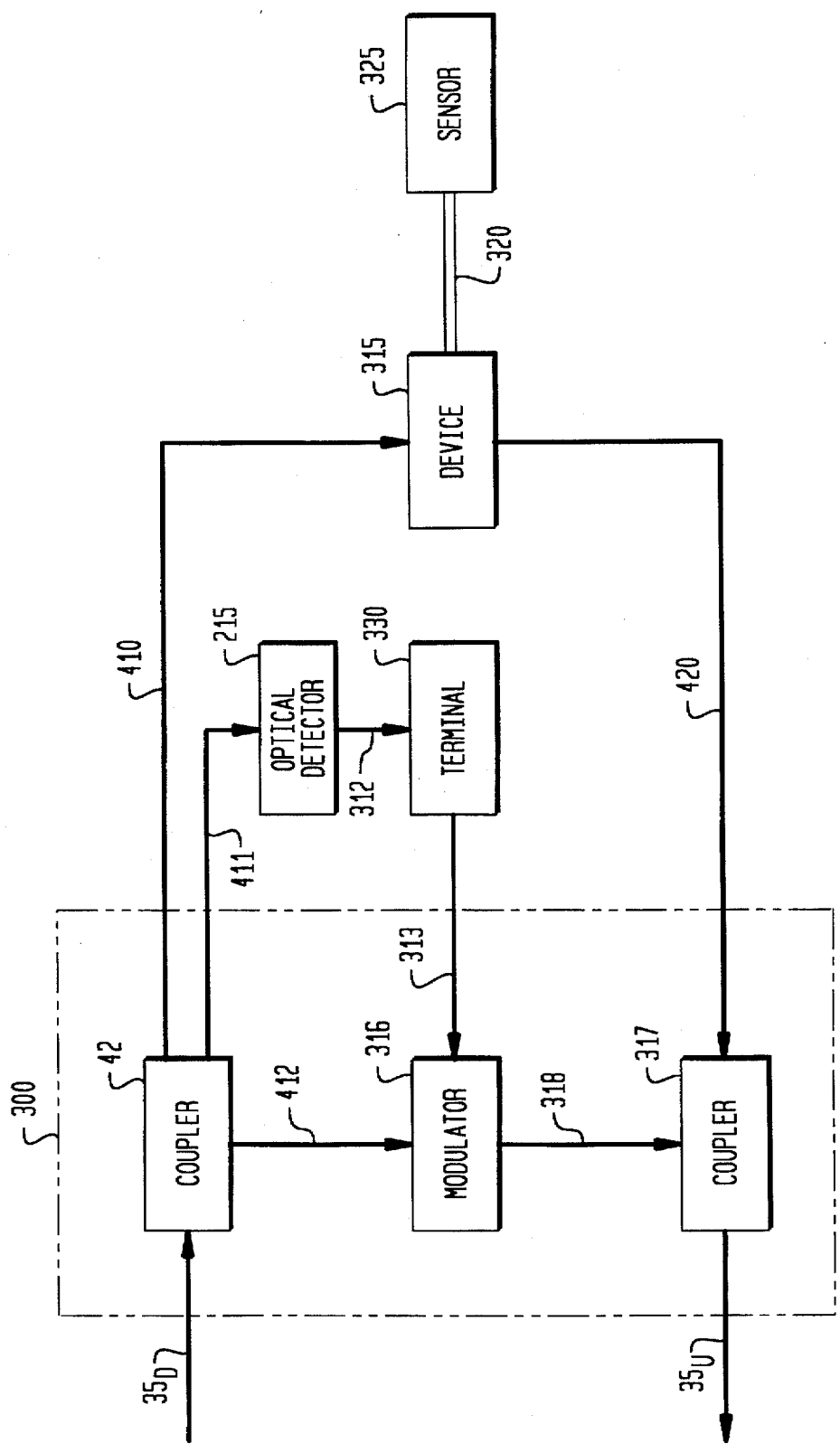
FIGS. 3A and 3B illustrate block diagrams of an optical network unit and a remote sensing system according to embodiments of the present invention.
Figure 3B:
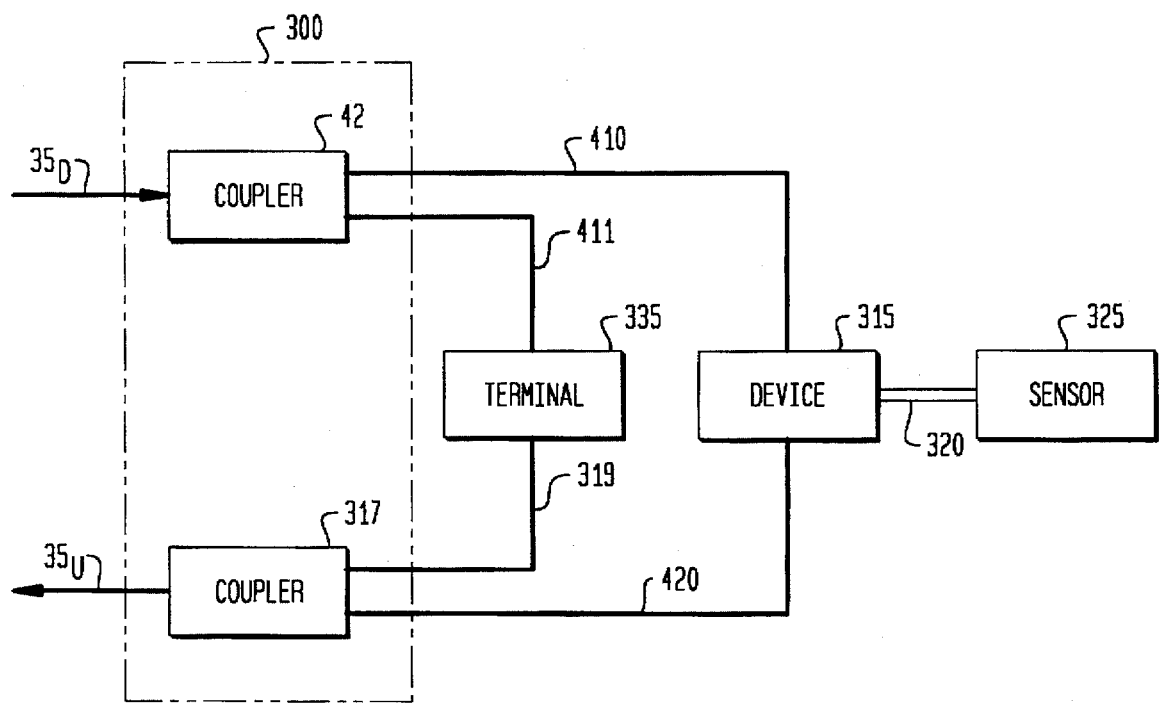

Other embodiments of the present invention are shown in FIGS. 3A and 3B, and are referred to as "optical signal reporting" type systems. ONU 300, instead of converting an optical signal to an electrical signal and distributing the electrical signal to the sensor device, distributes an optical signal to the reporting device. For example, as shown in FIG. 3A, optical signals are provided from a RN (not shown), via path $35_D$. Optical coupler 42, preferably a WDM device, splits the optical signal on path $35_D$ into two or more signal portions on paths 410, 411 and 412. Of course, it will be appreciated by those skilled in the art that to alleviate optical interference, coupler 42 could be replaced with a switch. The portion of the optical signal on path 410 is provided to device 315. The portion of the optical signal on path 411 is provided to receiver 215, which converts it to an electrical signal on path 312. The electrical signal on path 312 is provided to communication terminal 330 where downstream communication information is received. Terminal 330 also provides upstream electrical communication information signals on path 313 to modulator 316. Modulator 316 modulates or otherwise impresses the communication information on line 313 onto the optical signal on path 412 and provides it to coupler 317 via path 318. Normally, the optical sensor interrogation signal on path 410 passes through device 315 and is returned to ONU 300 via path 420. Coupler 317 couples the optical signals on paths 318 and 420 to provide an upstream composite signal for upstream transmission via path $35_U$. Device 315 can consist of a device that, in response to a stimulus such as an electrical or optical signal, interrupts or otherwise modifies the optical signal on path 410 being passed through and returned upstream on path 420. The purpose of device 315 is to report the status of sensor 325 by modifying the light from path 410 before sending it upstream. That is, sensor 325 can be polled by device 315 in response to a downstream sensor interrogation signal. Sensor 325 can comprise any well known type of sensor that detects variations in temperature, pressure, humidity, chemical residues or other environmental factors and generates a signal on path 320 when a predetermined condition occurs (e.g., when a predetermined temperature, pressure or humidity level is reached). In the alternative, a signal can be provided on path 320 that changes linearly or in some other manner in response to changes in a predetermined condition. In addition, sensor 325 can consist of an intrusion detection system that generates a signal on path 320 when a motion or sound detector is triggered or when continuity of a circuit is broken (i.e., when an intrusion is detected). Sensor 325 can be a device that generates and transmits an optical signal on optical path 320 when the predetermined threshold occurs or when the intrusion detection system detects an intrusion. For example, sensor 325 can represent a device that generates an infrared signal that is emitted along path 320 and received by an infrared receiver at device 315. In the alternative, sensor 325 can be a device that generates and transmits an electrical signal on path 320 when the intrusion detection system detects an intrusion, for example. In this case, path 320 can consist of one or more electrical wires. In the alternative, path 320 can represent a path in which an electromagnetic signal is transmitted from an antenna provided on sensor 325 to a receiving antenna provided on device 315. In other words, path 320 represents any type of path for transmitting an electrical, acoustic, electromagnetic or optical signal, for example. According to this embodiment of the present invention, when sensor 325 desires communication with the central office, the signal transmitted along path 320 causes device 315 to interrupt or otherwise modify the optical signal on path 410 that is being returned to ONU 300 on path 420. The modified signal on path 420 can then be detected at a remote monitoring station (not shown). Device 315 can consist of a mechanical device, for example, that moves into position to block the optical signal from passing from path 410 to path 420 when the signal is present on path 320. Sensor 325 can also communicate with terminal 330 across a communication path (not shown) to receive instructions or change some state of the ONU. It will also be appreciated that paths 410 and 412 can be a single fiber and paths 318 and 420 can be a single fiber, with devices 315 and 316 being provided in series. Device 315 could be integrated with, identical to or in series with modulator 316 and/or devices 42 and 315–317 could be integrated into the same physical device. As described above, coupler 42 could be a switch and not a WDM device. In the alternative, coupler 42 could be a standard coupler, with terminal 330 coordinating the information being provided to devices 315 and 316 to avoid interference.

It will be appreciated that in the alternative, the optical condition of device 315 can be monitored with conventional (OTDR) techniques by study of the optical signals returning on path $35_u$.

Another variation of this embodiment of the present invention is depicted in FIG. 3B. Coupler 42 (preferably a WDM) splits the optical signal on path $35_D$ onto path 410 and 411. The signal on path 411 provides downstream optical communication information to communication terminal 335. Terminal 335 provides upstream optical communication information to coupler 317 via path 319. Coupler 317 couples the optical communication information signal on path 319 with the sensor signal on path 420 to provide an upstream composite signal on path $35_u$.

According to variations on this embodiment of the present invention, device 315 could be provided as a subset of terminal 335 or in series with terminal 335. If device 42 is provided as a coupler and not a WDM device, devices 315 and 335 must cooperate with each other so that one is blocked while the other is operating in order to avoid possible interference on the upstream composite signal. Of course, it will be appreciated that devices 42 and 317 could also be provided as switches.

Figure 4:
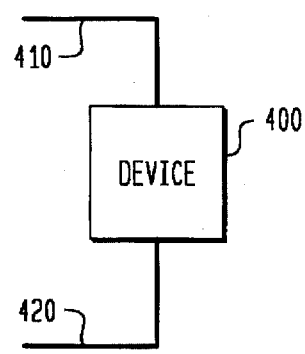
FIG. 4 illustrates a transponder according to an embodiment of the present invention.

Another embodiment of the present invention is depicted in FIG. 4 and is hereinafter referred to as an "optical transducer" type system. That is, in the following embodiments of the present invention, the sensor itself acts as a transducer reporting its status directly to the central office. According to this embodiment of the present invention, device 315 is replaced with device 400 that itself is directly responsive to an external stimulus (many interferametric and intensity modulation techniques are known). An optical signal transmitted along path 410 is normally passed through device 400 and directed upstream on path 420. However, when an external stimulus is present, the optical signal transmitted along path 410 is blocked or otherwise modified on its way upstream on path 420. The change in the optical signal on path 420 can then be detected at a remote monitoring station.

Figure 5B:
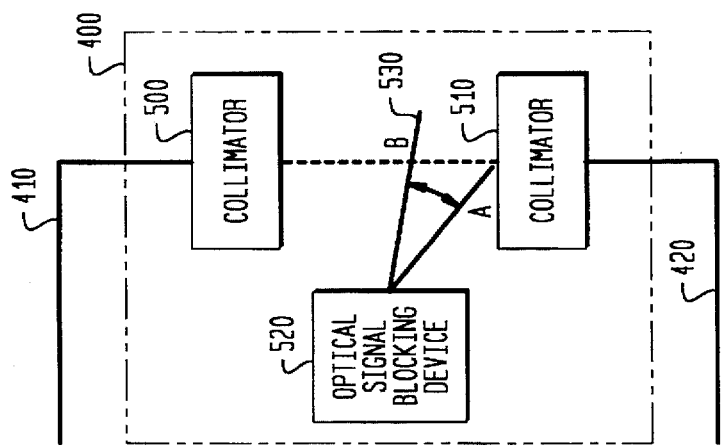
FIG. 5A–5C illustrate various types of transponders according to embodiments of the present invention.
Figure 5A:
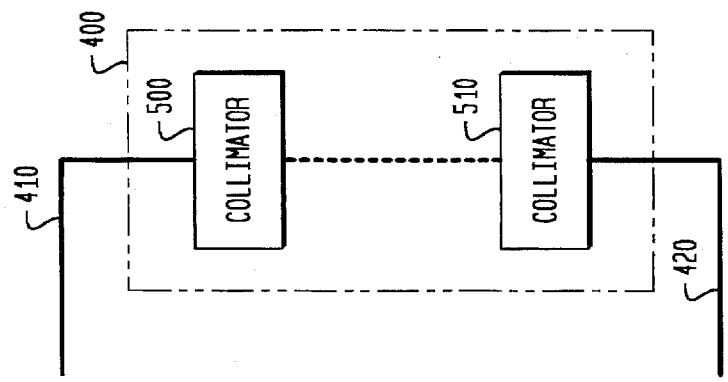

Different types of devices 400 can be used for blocking or otherwise modifying the optical signal on path 410, according to various embodiments of the present invention. For example, as shown in FIG. 5A, device 400 can consist of collimators 500 and 510. The optical signal transmitted along path 410 is formed into a freespace collimated beam and output by collimator 500. Collimator 510 normally collects the optical signal output by collimator 500, and the signal is passed upstream via path 420. Using a collimated beam of light allows the light to travel further, thus allowing collimators 500 and 510 to be placed further apart. This type of device is responsive to objects entering the line of sight between collimator 500 and collimator 510. That is, an object entering the line of sight will interrupt and prevent or otherwise modify the light emitted by collimator 500 from being collected by collimator 510. Accordingly, when an object enters between collimator 500 and collimator 510 the light beam is interrupted or modified as it is being passed upstream via path 420. Interruption or modification of the light beam can then be detected at a remote monitoring station, for example.

Of course, variations of this sensing scheme are possible. For example, according to the embodiment of the present invention as depicted in FIG. 5B, collimator 500 emits an optical signal which is collected by collimator 510, similar to that described above with respect to FIG. 5A. However, according to this embodiment of the present invention, an optical signal blocking device 520, in response to a measurand, selectively blocks the light beam from reaching collimator 510. Optical signal blocking device 520 includes a movable optical blocking member 530 that is capable of assuming position A or position B, as depicted in FIG. 5B. In position A, the optical signal emitted by collimator 500 is collected by collimator 510 and returned upstream to ONU 300 via path 420. In position B, optical blocking member 530 blocks the light being emitted by collimator 500 from being collected by collimator 510. Interruption of the light beam can then be detected at a remote monitoring station.

Figure 5C:
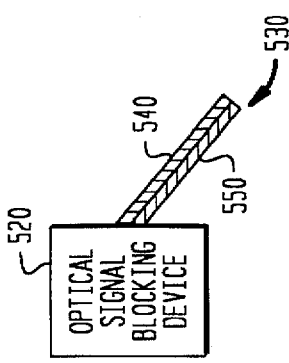

Optical signal blocking device 520 can consist of a device that moves blocking member 530 between position A and position B depending on temperature. For example, as shown in FIG. 5C, optical signal blocking device 520 can include a bimaterial vane 530. Such a bimaterial vane 530 consists of a first strip of material 540 having a first coefficient of thermal expansion. A second strip of material 550, having a coefficient of thermal expansion different than the first material, is adhered to first strip of material 540. Such a bimaterial vane 530 typically exhibits a characteristic of changing shape with variations in temperature. Accordingly, such a device would be useful for monitoring and detecting variations in temperature, for example. The device could be arranged so that during normal room temperature, bimaterial vane 530 assumes position A (FIG. 5B). During a severe temperature increase (e.g., during a fire), bimaterial vane 530 would assume position B, thus blocking the optical signal emitted from optical emitter 500 from being collected by optical receiver 510. Interruption of the light beam could then be detected at a remote monitoring station, interpreted as a fire, and appropriate action taken.

Optical blocking device 520 can also be designed to be responsive to variations in pressure (e.g., changes in water pressure or atmospheric pressure, etc.), or water level, for example. Such variations could be used to move optical blocking member 530 from position A to position B. Blocking member 530 can also be moved mechanically between position A and position B by an actuator, for example. Device 520 can also be integrated into the "optical signal reporting" type system as described above with respect to FIGS. 3A and 3B. For example, an electrical signal for driving the actuator could be derived from sensing device 325 that issues a signal to optical blocking device 520 when sensing a predetermined variation in temperature, pressure, etc., for example.

Figure 6:
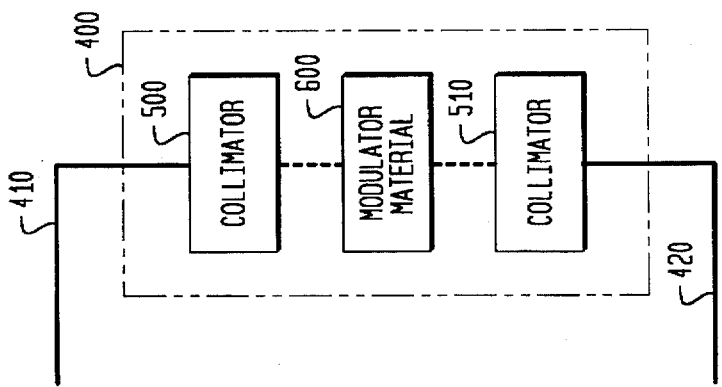
FIG. 6 illustrates another type of transponder according to a further embodiment of the present invention.

According to another embodiment of the present invention as depicted in FIG. 6, a modulator material 600 can be provided in the path of the collimated light beam. Modulator material 600 can consist of a material that is responsive to variations in an external stimulus. For example, modulator material 600 can be a thermally sensitive material that achieves different attenuation of light properties depending on temperature. Such a material at room temperature normally passes a relatively large percentage of optical light energy. Accordingly, at room temperature, a large percentage of the light energy emitted by collimator 500 is collected by collimator 510. However, after a temperature change, material 600 attenuates or absorbs a percentage of the optical energy of the light signal emitted by collimator 500 so that the light signal collected by collimator 510 is attenuated. This attenuation of light energy can then be detected at a remote monitoring station.

In the alternative, the characteristics of modulator material 600 can be such that its polarization characteristics vary depending on temperature, for example. At room temperature, the material exhibits a first polarization allowing light emitted from collimator 500 to pass through to collimator 510. At different temperatures, the polarization of light passing through material 600 changes, thus filtering a portion or all of the light emitted by collimator 500. Examples of materials exhibiting different polarizations at different temperatures, include liquid crystals, for example. Of course, it will be appreciated that practical devices for implementing this embodiment of the present invention may require more then one optical path through material 600.

According to another embodiment of the present invention, modulator material 600 consists of a material that, when impinged with the light energy emitted by collimator 500, enters a first state. In this first state, the material allows the optical signal emitted by collimator 500 to pass through to collimator 510. Modulator material 600, when stimulated by an external stimulus such as temperature, pressure, etc., enters a second state. In this second state, the optical signal emitted by collimator 500 is attenuated. The attenuated optical signal is collected by collimator 510, routed upstream on path 420 and can be monitored by a remote monitoring station to determine the state of the material and thus the temperature or pressure. The optical condition of material 600 can also be monitored with conventional (OTDR) techniques by study of the optical signals returning on path 350.

Figure 7:
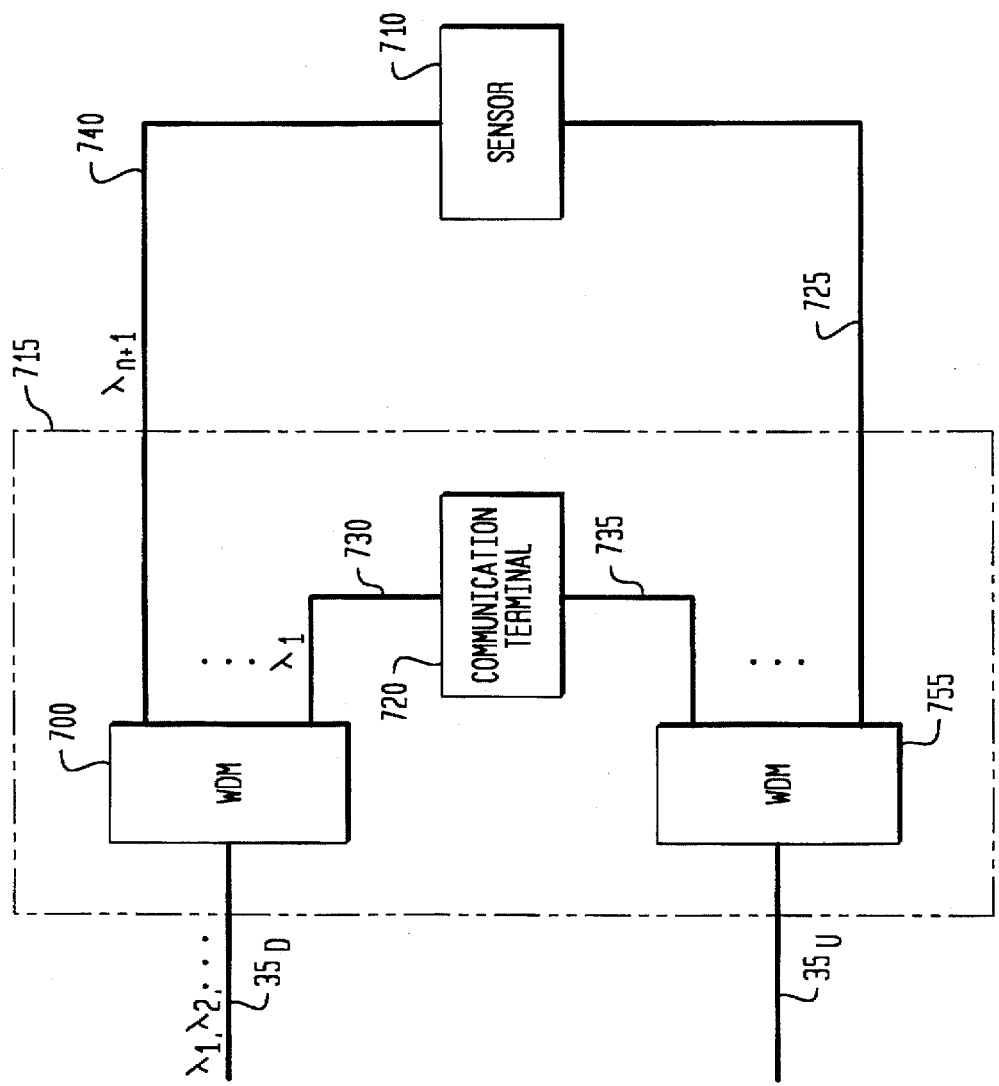
FIG. 7 illustrates an optical network unit and transponder according to an embodiment of the present invention.
Figure 8:
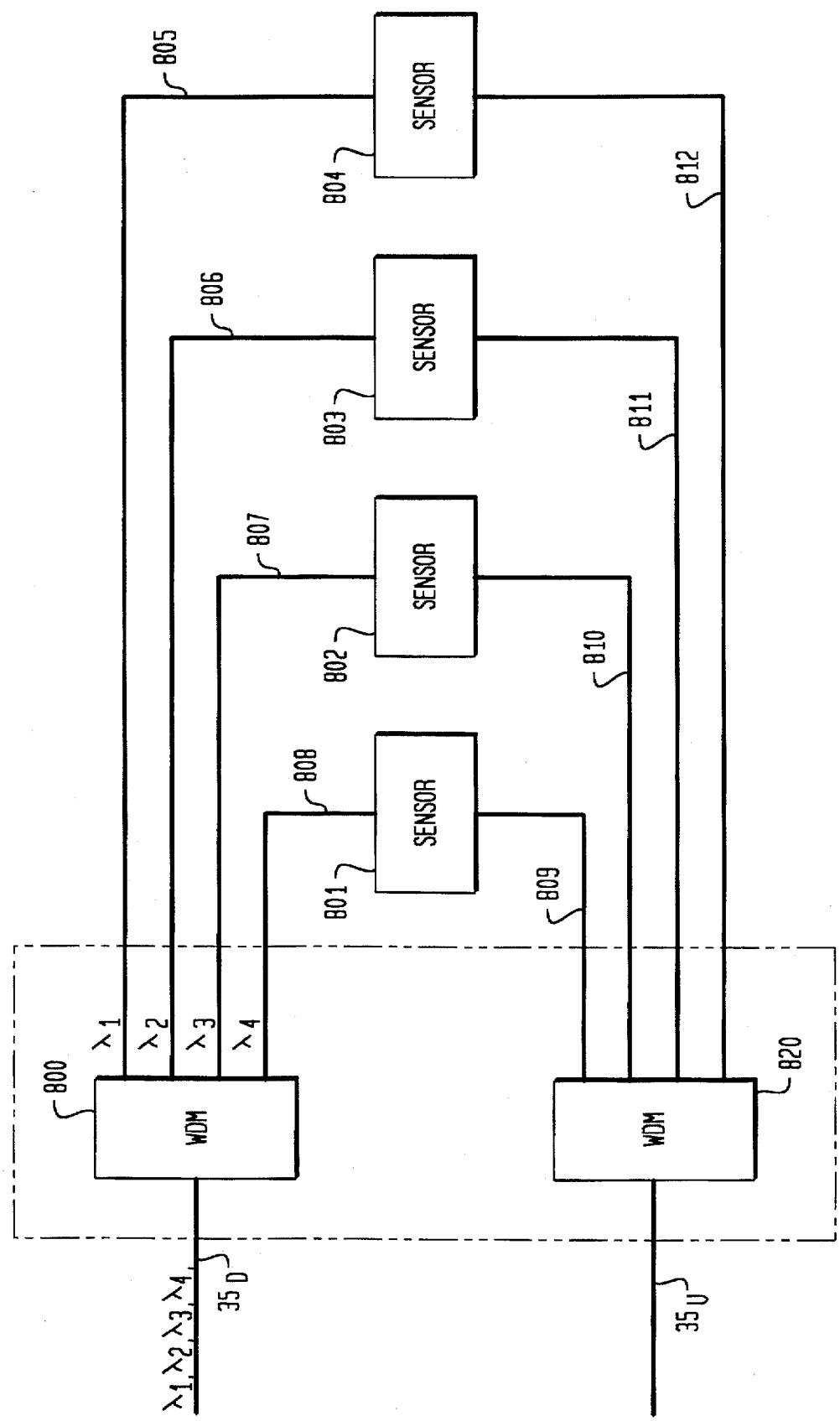
FIG. 8 illustrates an optical network unit and a plurality of transponders and/or terminals according to an embodiment of the present invention.

Another embodiment of the present invention is depicted in FIG. 7. According to this embodiment of the present invention, the sensor information can be provided on a separate and distinct wavelength from other data (e.g., telecommunications information, etc.), that are being communicated by the system. Plural wavelengths of light are transmitted along optical path $35_D$ to ONU 715. ONU 715 can include wavelength division multiplexers (WDM 700 and 755). WDM 700 routes light signal $\lambda_{n+1}$ along optical path 740 and to sensor 710. Light signal $\lambda_{n+1}$ is then used to optically interrogate sensor 710 in an appropriate manner as indicated in one of the above-described embodiments. Light signal $\lambda_1$ is routed along optical path 730 and to an optical communication terminal 720, not unlike ONU 40, for example, which modulates the optical signal with information analogous to the light on path 210 in FIG. 2. The optical signal from sensor 710 is transferred along optical path 725 to WDM 755. The optical signal from optical communication terminal 720 having information modulated thereon is transferred along optical path 735 also to WDM 755. The optical signals are combined in WDM 755 into a composite signal and routed upstream along optical path $35_u$. Of course, it will be appreciated that the WDMs can include multiple ports. For example, as shown in FIG. 8, WDM 800 includes four different output ports for routing a plurality of different wavelength optical signals $\lambda_1$–$\lambda_4$ along optical paths 805–808, each to a different sensor, sensor array or optical communication terminal 801–804 to interrogate each with a different wavelength of light. For example, one sensor can be responsive to variations in temperature, one can be responsive to variations in pressure (water or ambient pressure, for example), etc. The optical signals returning from the sensors and terminals via optical paths 809–812 can then be combined in WDM 820 and routed upstream as a composite upstream signal via path $35_U$. As before, if device 800 is not a WDM, then control of the signals on the paths must be provided in order to avoid interference on the upstream path.

Figure 9:
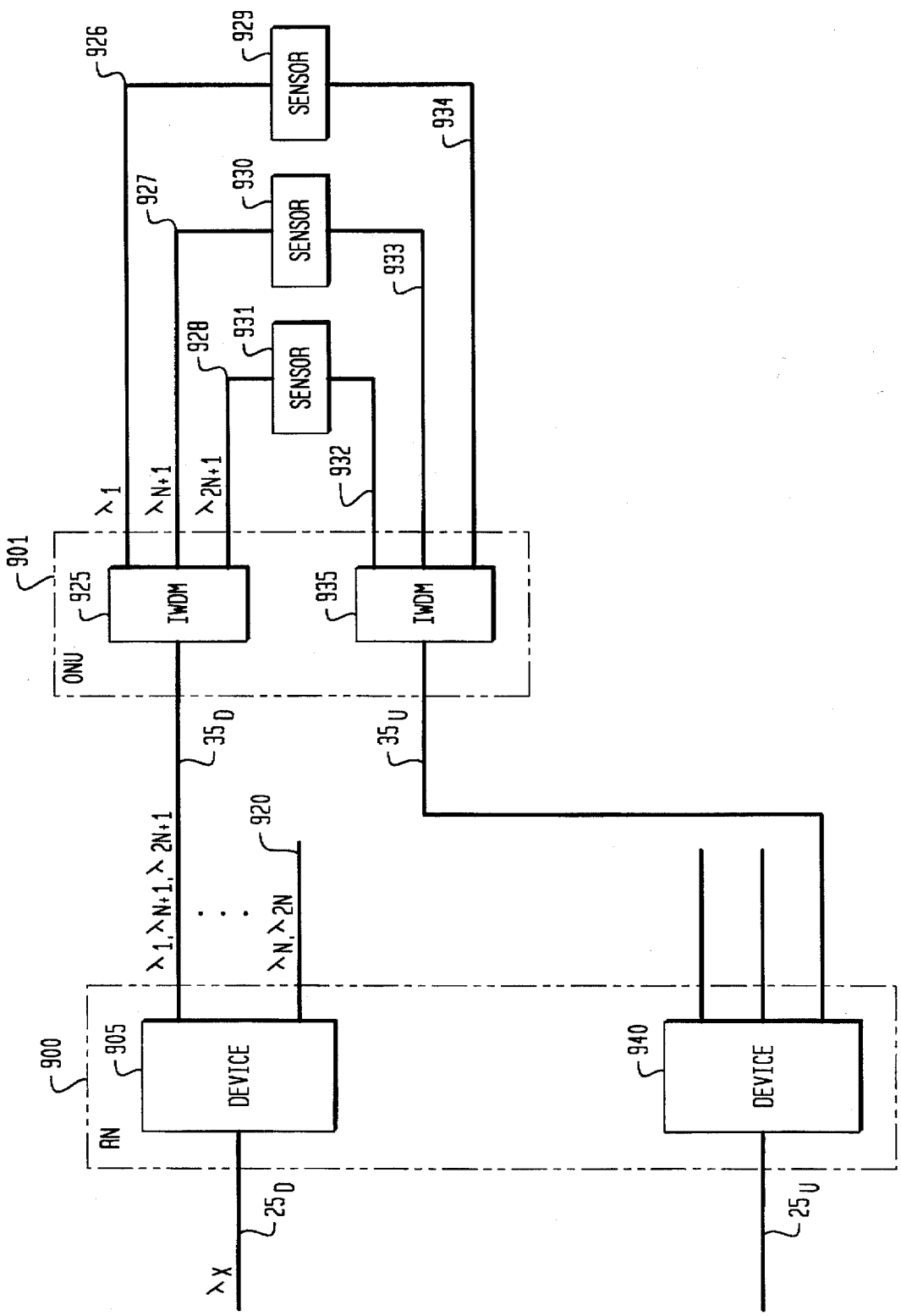
FIG. 9 illustrates an optical network unit and an intermediate wavelength division multiplexer according to an embodiment of the present invention.

Still another embodiment of the present invention is depicted in FIG. 9. Devices 905 and 940 form a remote node 900 and ONU 901 includes an intermediate wavelength division multiplexer (IWDM) 925. Selectivity in IWDM 925 is comparable to the free spectral range of WDM/R 905 in the remote node. A broad spectrum optical signal $\lambda_x$ is input on path $25_D$ to WDM/R 905. WDM/R 905 is a "Dragone" router which has the characteristic of separating the broad spectrum optical signal $\lambda_x$ as shown. Wavelengths $\lambda_1$, $\lambda_{N+1}$, $\lambda_{2N+1}$, etc. are routed along path 35D. Wavelengths $\lambda_N$, $\lambda_{2N}$, etc. can be routed along other paths 920, to other ONUs, for example. IWDM 925 further separates the optical signals on path 910 into its constituent parts. Optical signal $\lambda_1$ is routed along path 926, optical signal $\lambda_{n+1}$ is routed along path 927 and optical signal $\lambda_{2n+1}$, is routed along path 928. Each of the optical signals from IWDM 925 can then be used to optically interrogate sensors 929, 930 and 931, respectively, in one or more of the manners described previously. The optical signals normally passing through the sensors and routed along paths 932, 933 and 934 are combined in IWDM 935 and routed upstream on path $35_U$. The signals on path $35_U$ can then be combined in WDM/R 940 and routed upstream via path $25_U$. As before, WDM/R 940 and WDM/R 905 can be the same physical device.

It will be appreciated that the foregoing description and drawings are only intended to be illustrative of the present invention. Variations, changes, substitutions and modifications of the present invention may occur to those skilled in the art without departing from the spirit and scope of the present invention. Accordingly, it is intended that the present invention be limited only by the scope of the appended claims.

What is claimed is:

1. A sensing and communication system comprising:
   an optical receiver for receiving downstream optical signals and for converting the downstream optical signals to downstream electrical signals;
   an optical transducer for impressing information in an upstream data signal onto upstream optical signals;
   at least one sensor responsive to an external stimulus for providing sensor information signals, said external stimulus being unrelated to functional operation of the system; and
   a processor for receiving the downstream electrical signals and for establishing communication channels to at least one communication terminal providing communication information signals, and to the at least one sensor, wherein the at least one terminal and the at least one sensor provide the communication information signals and the sensor information signals, respectively, to the processor which forwards the information signals to the optical transducer as the upstream data signal.

2. A sensing and communication system as recited in claim 1, wherein the optical transducer is a source for converting electrical signals into optical signals.

3. A sensing and communication system as recited in claim 2, wherein the source is a LASER.

4. A sensing and communication system as recited in claim 2, wherein the source is a broadband optical source.

5. A sensing and communication system as recited in claim 1, wherein the downstream optical signal is coupled to the upstream optical signal.

6. A sensing and communication system as recited in claim 5, wherein the upstream optical signal is amplified by the optical transducer.

7. A sensing and communication system as recited in claim 5, wherein the optical transducer modulates the upstream optical signals.

8. A sensing and communication system as recited in claim 1, wherein the at least one sensor is polled by the processor to provide the sensor information signals.

9. A sensing and communication system as recited in claim 8, wherein the at least one sensor is polled in response to a downstream optical signal.

10. A sensing and communication system as recited in claim 8, wherein the processor determines when to poll the at least one sensor.

11. A sensing and communication system as recited in claim 1, wherein the sensor interrupts the processor in response to an external stimulus.

12. A sensing and communication system as recited in claim 1, wherein the processor provides upstream data signals that correspond to a predetermined number in response to a predetermined set of sensor information signals.

13. A sensing and communication system as recited in claim 1, wherein the processor causes an emergency alert signal to be sent as the upstream data signal in response to a predetermined set of sensor information signals.

14. A sensing and communication system as recited in claim 1, wherein the upstream optical signal includes identification information.

15. A sensing and communication system as recited in claim 1, wherein the upstream optical signal causes instructions to be sent on the downstream electrical signal.

16. The sensing and communication system of claim 1, wherein said sensor is selected from the group consisting of an environmental sensor and a security-type sensor.

17. The sensing and communication system of claim 16, wherein said environmental sensor is one of a temperature sensor, a chemical residue sensor, a smoke sensor, a sound sensor, a pressure sensor, a carbon monoxide sensor or a humidity sensor.

18. The sensing and communication system of claim 16 wherein said security-type sensor is one of a motion sensor, a sound sensor or an intrusion sensor.

19. A sensing system comprising:
   an optical coupler for receiving at least a portion of a downstream optical signal and for providing a downstream optical sensor interrogation signal and a downstream communication information signal;
   a communication device for receiving the downstream communication information signal and for providing an upstream communication information signal;
   at least one sensor responsive to an external stimulus for providing sensor information signals;
   an optical signal modification device for receiving the downstream optical sensor interrogation signal and for modifying at least a portion of it to provide an upstream sensed signal in response to the sensor information signals; and
   an upstream optical coupler for combining the upstream communication information signal and the upstream sensed signal into a composite upstream optical signal.

20. A sensing system as recited in claim 19, wherein the optical coupler comprises a WDM device.

21. A sensing system as recited in claim 19, wherein the at least one sensor is polled by the optical signal modification device in response to the sensor interrogation signal.

22. A sensing system as recited in claim 19, wherein the at least one sensor provides an electrical signal to the optical signal modification device in response to the external stimulus.

23. A sensing system as recited in claim 19, wherein the at least one sensor provides an optical signal to the optical signal modification device in response to the external stimulus.

24. A sensing system as recited in claim 19, wherein the at least one sensor provides an electromagnetic signal to the optical signal modification device in response to the external stimulus.

25. The sensor system of claim 19, wherein said external stimulus is unrelated to functional operation of said system.

26. The sensor system of claim 25, wherein said at least one sensor is selected from the group consisting of an environmental sensor and a security-type sensor.

27. A sensing system comprising:
 an optical coupler for receiving at least a portion of a downstream optical signal and for providing a downstream optical sensor interrogation signal and a downstream communication information signal;
 a communication device for receiving the downstream communication information signal and for providing an upstream communication information signal;
 an optical signal modification device for receiving the downstream optical sensor interrogation signal and for modifying at least a portion of it to provide an upstream sensed signal in response to an external stimulus; and
 an upstream optical coupler for combining the upstream communication information signal and the upstream sensed signal to form a composite upstream optical signal.

28. A sensing system as recited in claim 27, wherein the optical signal modification device attenuates the downstream optical sensor interrogation signal in response to the external stimulus.

29. A sensing system as recited in claim 28, wherein the optical signal modification device blocks the downstream optical sensor interrogation signal in response to an external stimulus.

30. A sensing system as recited in claim 27, wherein the optical signal modification device includes a material in which a polarization of the downstream optical sensor interrogation signal passing through the material changes in response to an external stimulus.

31. A sensing system as recited in claim 27, wherein the optical signal modification device exhibits a state change and becomes responsive to the external stimulus in response to the downstream optical sensor interrogation signal.

32. The sensor system of claim 27, wherein said external stimulus is unrelated to functional operation of said system.

33. The sensor system of claim 32, wherein said at least one sensor is selected from the group consisting of an environmental sensor and a security-type sensor.

34. An optical reporting technique comprising the steps of:
 receiving downstream optical signals and converting them to downstream electrical signals;
 providing sensor information signals from a sensor responsive to an external stimulus;
 receiving the downstream electrical signals and establishing communication channels to at least one communication terminal that provides communication information signals, and establishing a communication channel with the sensor; and
 providing the communication information signals and the sensor information signals as an upstream data signal to be impressed onto an upstream optical signal.

35. An optical reporting technique comprising the steps of:
 receiving at least a portion of a downstream optical signal and providing a downstream optical sensor interrogation signal and downstream communication information signal;
 receiving the downstream communication information signal and providing an upstream communication information signal;
 providing a sensor information signal in response to an external stimulus;
 modifying the downstream optical sensor interrogation signal in response to the sensor information signal to provide an upstream sensed signal; and
 combining the upstream communication information signal and the upstream sensed signal.

36. An optical reporting technique comprising the steps of:
 receiving at least a portion of a downstream optical signal and providing a downstream optical sensor interrogation signal and a downstream communication information signal;
 receiving the downstream communication information and providing an upstream communication information signal;
 receiving the downstream optical sensor interrogation signal and modifying at least a portion of it to provide an upstream sensed signal in response to an external stimulus; and
 combining the communication information signal and the upstream sensed signal.

* * * * *